United States Patent [19]
Kim

[11] Patent Number: 6,099,119
[45] Date of Patent: Aug. 8, 2000

[54] EYEGLASSES INCLUDING THREADING MEANS AND MECHANICALLY BONDED MEANS

[75] Inventor: Ji Woong Kim, Masan, Rep. of Korea

[73] Assignee: Pareto Corporation, N.Y.

[21] Appl. No.: 09/425,120

[22] Filed: Oct. 22, 1999

[51] Int. Cl.[7] .................................................. G02C 1/04
[52] U.S. Cl. .......................... 351/103; 351/106; 351/110; 351/144
[58] Field of Search ........................... 351/103–110, 154, 351/140, 144

[56] References Cited

U.S. PATENT DOCUMENTS

| | | | |
|---|---|---|---|
| 4,464,025 | 8/1984 | Lhospice | 351/106 |
| 4,527,871 | 7/1985 | Sohyer | 351/106 |

*Primary Examiner*—Huy Mai
*Attorney, Agent, or Firm*—Ostrolenk, Faber, Gerb & Soffen, LLP

[57] ABSTRACT

Semi-rimless or rimless eyeglasses wherein the rimless portion comprises a flexible strand, at least one end of which is threaded through one or more holes in an anchoring plate or upper rim portion and mechanically bonded thereto, thereby securing the lens within the frame.

32 Claims, 4 Drawing Sheets

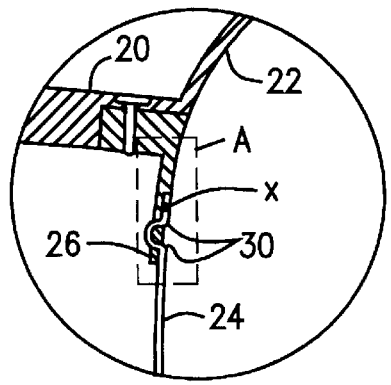
FIG. 2
FIG. 3
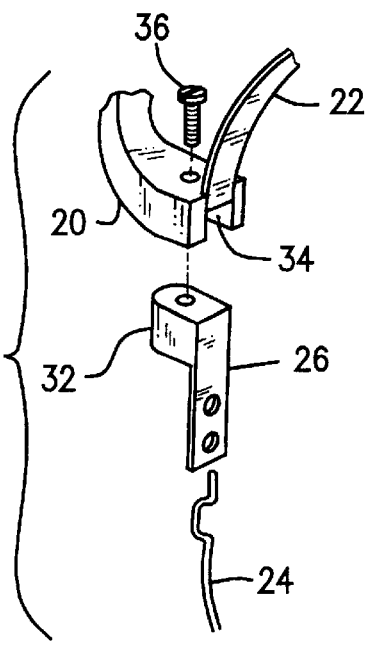
FIG. 4
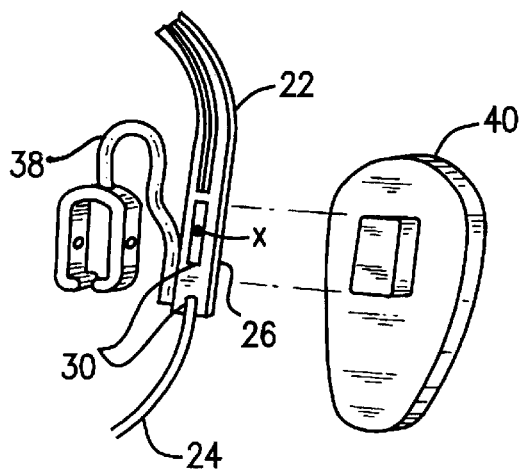
FIG. 5

EYEGLASSES INCLUDING THREADING MEANS AND MECHANICALLY BONDED MEANS

BACKGROUND OF THE INVENTION

The present invention relates to an improvement in eyeglasses, and more particularly, to eyeglasses used for protective eyewear purposes (safety eyeglasses).

Eyeglasses were primarily developed and intended to correct human vision. However, they also need to be fashionable and comfortable. To meet these demands, various kinds of eyeglasses are produced which are lightweight, provide a wide range of vision, a fashionable style, a stylish appearance, and the least amount of obstruction as possible to the wearer's facial features. Semi-rimless and rimless eyeglasses are very popular because they meet these requirements. Particularly, semi-rimless and rimless eyeglasses provide the least amount of obstruction or distraction to the facial features of the wearer and do not disturb the wearer's vision.

Rimless and semi-rimless eyeglasses are well known in the art. A "rim" of an eyeglass frame is a relatively rigid piece that holds a lens in place along all or part of the lens' edge. In a semi-rimless frame, there is a rim on the upper half of the frame but not on the lower half of the frame. The lower half of the frame, instead, secures the lens to the frame by using a flexible wire or cord. In a rimless frame, neither the upper or lower half of the frame uses a rim. A flexible wire or cord secures the lens on both the top and bottom.

While rimless and semi-rimless frames are known per se, they have not been used for safety eyeglasses. Safety eyeglasses require that the eyeglass frames, once the lenses are inserted, meet government approved standards for eye protection, specifically impact tests prescribed by the American National Standards Institute (ANSI) Z-87 Standard for Eye and Face Protection. Because of these requirements, prior art safety eyeglasses have utilized full (and often thick) rims (both top and bottom) to hold the lenses securely in place.

The prior art rimless and semi-rimless frames do not pass government approved eye protection standards and impact tests mainly because the construction and materials used are not strong enough to meet the ANSI tests as described below. Thus, they cannot be used as safety eyeglasses. Those required to wear safety eyeglasses are, therefore, forced to sacrifice the appearance, style and comfort that semi-rimless and rimless frames provide. The present invention makes it possible to make a semi-rimless and rimless safety eyeglass that will pass the required impact tests.

Prior art rimless and semi-rimless frames are generally constructed using nylon cord or metal wire. In nylon semi-rimless and rimless frames, a nylon cord surrounds the lower portion of the lens and a rim (in a semi-rimless style) or a wire (in a rimless style) comprises the upper portion of the frame. The nylon cord supports the lower portion of the lens by fitting within a groove in the edge of the lens which runs along its circumference. Each end of the nylon cord is secured to the upper portion of the frame by being snaked or looped through very small holes in each end of the rim (in a semi-rimless style) or in anchoring plates attached to the temple on one side and the bridge on the other (in a rimless style).

Prior art rimless and semi-rimless frames utilize the nylon cord system because the resulting frames will not block or impede the wearer's vision, because the nylon cord is inexpensive, and because the nylon cord is flexible and therefore allows for easy insertion of the lens into the eyeglass frame.

However, the nylon cord system is not suitable for safety eyeglasses mainly because of its flexibility and lack of strength. The nylon cord may stretch and, therefore, loosen its hold on the lens. Under stress or impact, the nylon cord may, in fact, break. Additionally, the method by which the nylon cord secures the lens, i.e., by threading through small holes in the rim or in anchoring plates, renders the lenses prone to falling out of the frames under impact because the nylon may "unthread", pop or pull out of the small holes under stress. Thus, frames using the nylon cord system will not pass the ANSI tests and cannot be used as safety eyeglasses.

As an alternative to nylon cord, prior art semi-rimless and rimless frames use a very thin metal wire along the lower portion of the frame in order to secure the lens. Rather than looping or threading as is done with the nylon cord system, each end of the metal wire is soldered to the same area of the frame where the nylon cord would have been threaded or looped.

The metal wire soldering method is useful because the metal wire is much stronger and less elastic than nylon cord. However, soldering is not sufficient to meet the ANSI impact tests. The metal wire may pop out or break at the solder location under stress.

Thus, the prior art has not disclosed a rimless or semi-rimless frame that will pass the ANSI federal safety standards and impact requirements. The prior art rimless and semi-rimless frames, therefore, cannot be used as safety eyeglasses.

SUMMARY OF THE INVENTION

It is an object of the present invention to overcome the explained problems above and the disadvantages of the prior art semi-rimless and rimless eyeglasses. The present invention provides for rimless and/or semi-rimless eyeglasses utilizing a threaded and bonded flexible strand, preferably a metal wire, for securing lenses to the eyeglass frames.

It is an object of the present invention to provide rimless and/or semi-rimless eyeglasses that will meet or exceed federal safety standards and pass impact tests for safety eyeglasses.

It is also an object of the present invention to provide rimless or semi-rimless eyeglasses and a method for constructing the frame and securing lenses thereto that combines the advantages of nylon cord with the advantages of soldered metal wire. Additionally, the aforementioned frames and the method of constructing and securing lenses thereto are intended to provide aesthetically pleasing eyeglasses with the lightness of a nylon cord design while also meeting the stringent federal safety and impact standards for safety eyeglasses.

Other objects, features and advantages of the present invention will become apparent from the following description of the invention which refers to the accompanying drawings.

BRIEF DESCRIPTION OF THE DRAWINGS

For the purpose of illustrating the invention, there is shown in the drawings several forms which are presently preferred, it being understood, however, that the invention is not limited to the precise arrangements and instrumentalities shown.

FIG. 2 is an enlarged view in cross-section of one of the temple sides of the eyeglasses of FIG. 1.

FIG. 3 is an enlarged view of the area designated "A" in FIG. 2.

FIG. 4 is an enlarged and exploded view of the assembly on the temple side shown in FIG. 2.

FIG. 5 is an enlarged view of the assembly on the nasal side of the lens frame shown in the eyeglasses of FIG. 1.

DETAILED DESCRIPTION OF THE INVENTION

Figure 1:
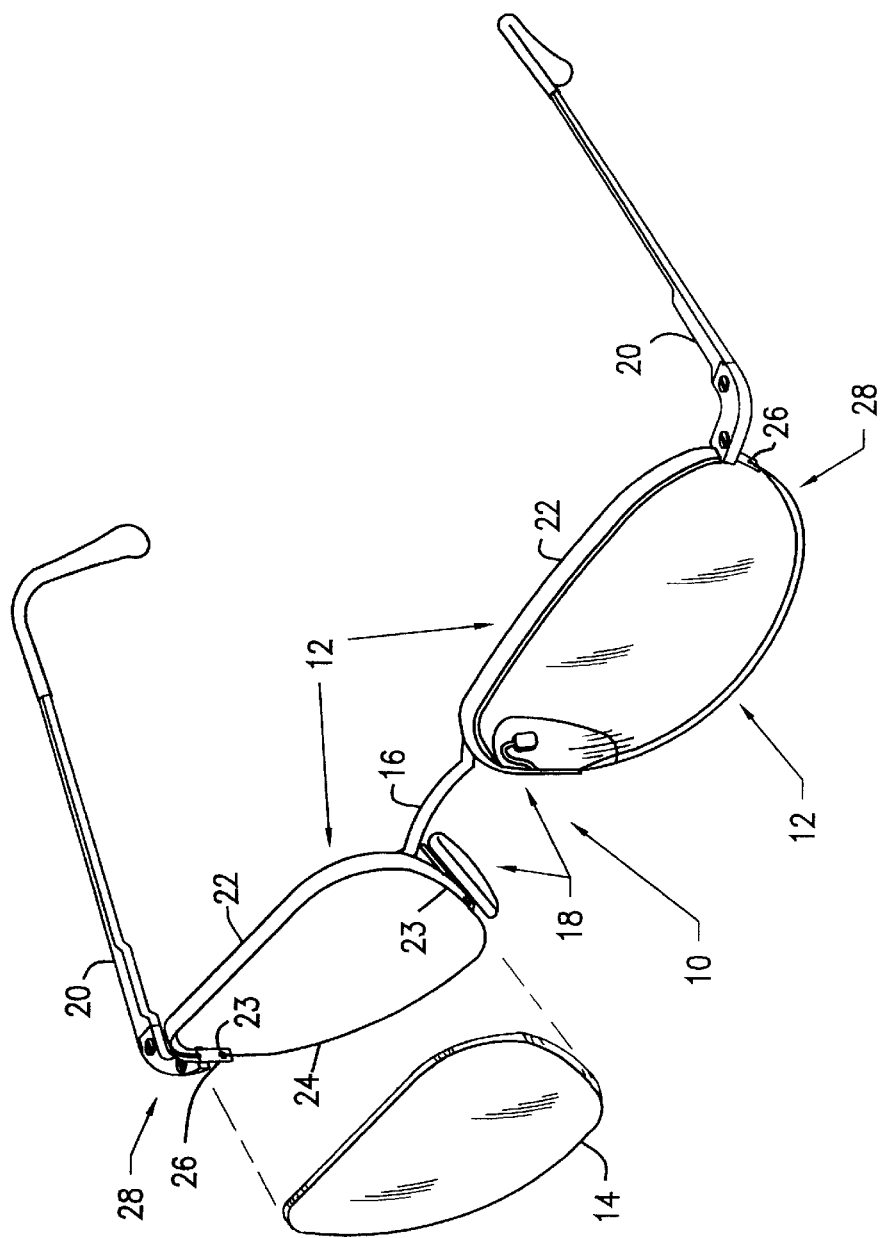
FIG. 1 is a perspective view of semi-rimless eyeglasses showing an embodiment of the present invention.

The preferred embodiment of the present invention is now described referring to the drawings, wherein like numerals indicate like elements.

There is shown in FIG. 1, a pair of eyeglasses 10 comprising two lens frames 12 for conventional or safety lenses 14, a bridge 16 coupling the lens frames 12 on the nasal side 18 of each lens 14, and a pair of temple support pieces 20, each attached to one of the lens frames 12 on the temple side 28 of the lens frame 12. The lens frame 12 is comprised of a rigid upper support portion 22, also referred to as a rigid upper frame portion, that forms the upper half of the lens frame 12, a flexible lower support portion 24 that forms the lower half of the lens frame 12, and two rigid lateral support portions 26 that connect the rigid upper support portion 22 and the flexible lower support portion 24. The rigid lateral support portions 26, also denoted as anchoring plates, are for supporting the upper and lower halves of the lens frame 12. In the preferred embodiment, the rigid upper support portion 22 is comprised of metal and the flexible lower support portion 24 is comprised of a flexible strand preferably of metal wire.

When flexible strand 24 is comprised of metal wire, it is further preferred that the wire be between 0.4 and 0.7 mm in diameter to maximize the advantages of the invention. Other diameter wire may be utilized; however, certain aesthetic advantages may be sacrificed with wire of a diameter greater than 0.7–0.8 mm.

FIG. 2 is an enlarged view in cross-section of one of the temple sides 28 of the eyeglasses in FIG. 1 showing the connection between the flexible strand 24 and the rigid upper support portion 22. The connection includes a threading of the flexible strand 24 through holes 30 in anchoring plate 26 and a mechanical bonding of the flexible strand 24 to anchoring plate 26, preferably by soldering.

FIG. 3 shows an enlarged, cross-sectional view of the area designated as "A" in the temple side 28 view shown in FIG. 2. As shown therein, anchoring plate 26 is preferably a flat, elongated metal piece which protrudes downwardly from (and is preferably integral with) rigid upper support portion 22.

As best shown in FIGS. 2 and 3, flexible strand 24 is threaded through holes 30 formed in anchoring plate 26 so that there are several locations at which the flexible strand 24 abuts against sharp corners of the holes 30. This forms strong frictional adhesion between the flexible strand 24 and the holes 30 which resists any attempt to remove the flexible strand 24 from the holes 30. Flexible strand 24 is also mechanically bonded, preferably by soldering, to a portion of anchoring plate 26. Other bonding techniques, such as welding or gluing can also be used.

As shown in FIG. 2, flexible strand 24 is bonded to anchoring plate 26 at point "x" on the flexible strand 24 after it has been threaded through holes 30 as shown in FIG. 3. The flexible strand 24 can be bonded to anchoring plate 26 at any point along anchoring plate 26 after the flexible strand 24 has been threaded through holes 30. While two holes are shown, other numbers of holes (1, 3, 4, etc.) can be used.

FIG. 4 is an exploded view of the temple side 28 of the eyeglasses shown in FIG. 1. Anchoring plate 26 is connected to, or alternatively is a part of, lug 32 which is preferably housed within a recess 34 of temple support piece 20. Lug 32 is secured within recess 34 of temple support piece 20 by, for example, a screw 36. Flexible strand 24 is threaded through holes 30 in anchoring plate 26 as previously shown in FIG. 3 and bonded to anchoring plate 26, such as by soldering. Rigid upper support portion 22 is coupled to temple piece 20.

FIG. 5 shows an enlarged view of the assembly on the nasal side 18 of lens frame 12 shown in FIG. 1. As shown therein, anchoring plate 26 is preferably flat and elongated and protrudes downwardly from rigid upper support portion 22. The invention contemplates anchoring plate 26 of other shapes as well. For example, anchoring plate 26 need not be flat, but may be the same shape and dimensions as rigid upper support portion 22. Anchoring plate 26 can be formed as a separate piece bonded to rigid upper support portion 22 or as part of rigid upper support portion 22. Anchoring plate 26 is shown in FIG. 5 as part of rigid upper support portion 22. Anchoring plate 26 comprises that part of rigid upper support portion 22 where the threading and bonding of flexible strand occur.

In FIG. 5, nose pad arm 38 is shown affixed to the anchoring plate 26 on the rear edge of anchoring plate 26. Alternatively, nose pad arm 38 may be affixed elsewhere such as further up on the nasal side of rigid upper support portion 22. Nose pad 40 fits within the corresponding recess in nose pad arm 38.

Figure 6:
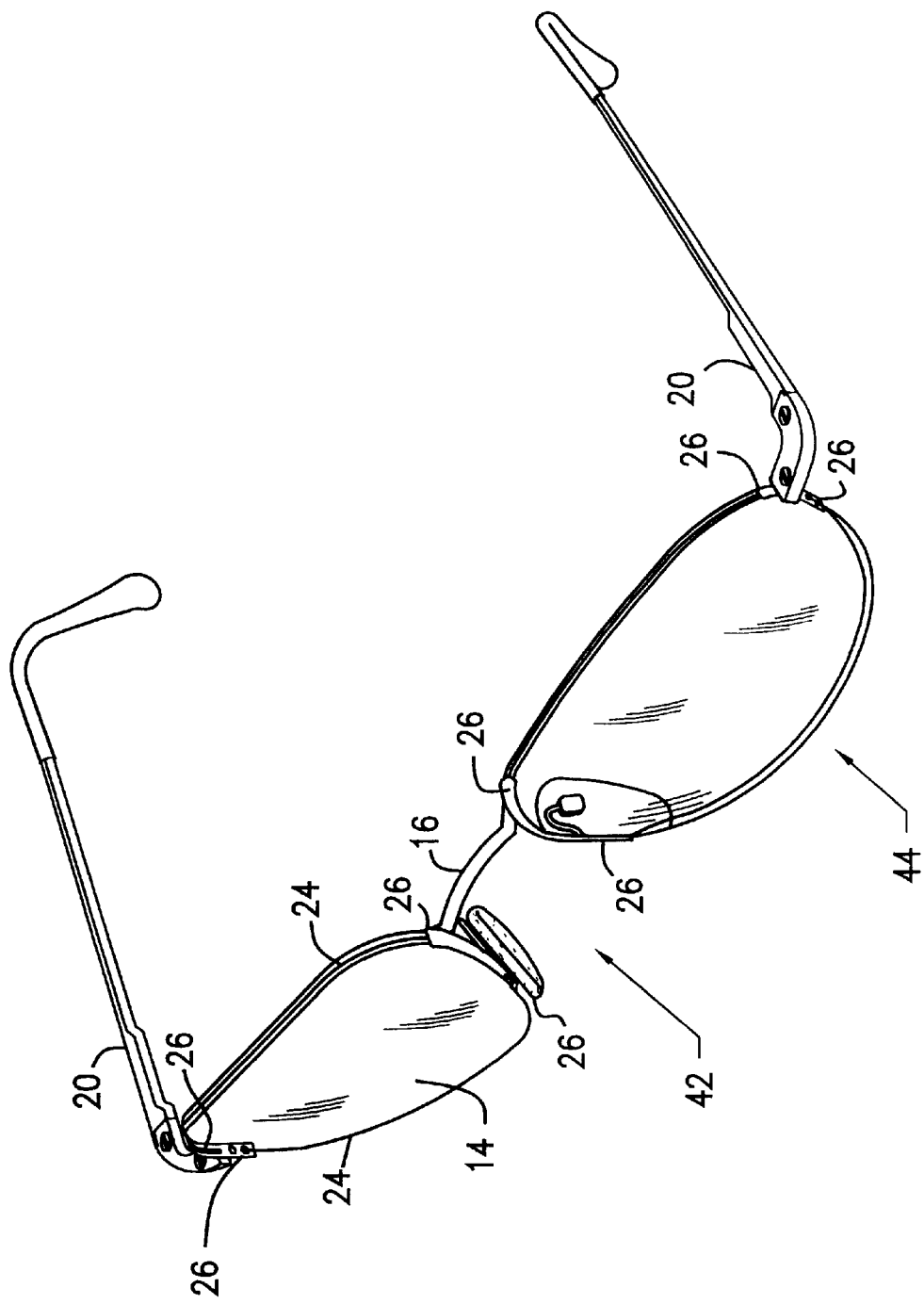
FIG. 6 is a perspective view of rimless eyeglasses showing a second embodiment of the present invention.

The eyeglasses shown in FIGS. 1–5 are "semi-rimless" eyeglasses. The eyeglasses of FIGS. 1–5 can also be constructed as a "rimless" frame as depicted in FIG. 6. In this second embodiment, as shown in FIG. 6, eyeglasses 42 comprises elements identical to those of eyeglasses 10 of FIG. 1 with the exception that flexible strand 24 is used in place of the rigid upper support portion 22.

Figure 7:
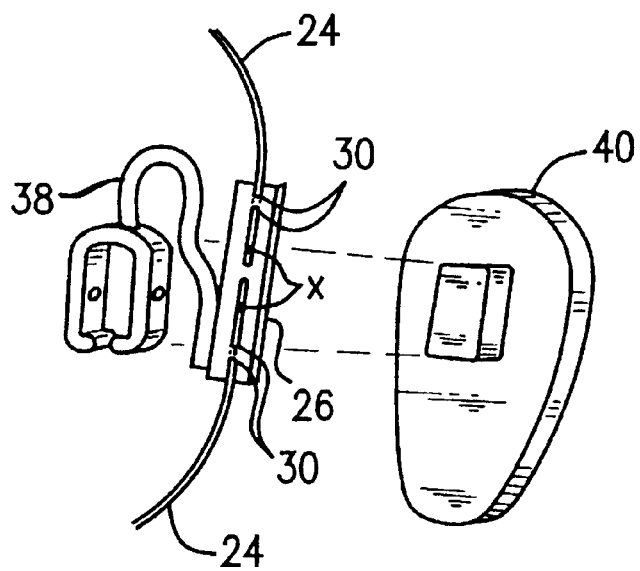
FIG. 7 is an enlarged view of the assembly on one of the nasal sides of the rimless eyeglasses shown in FIG. 6.
Figure 8:
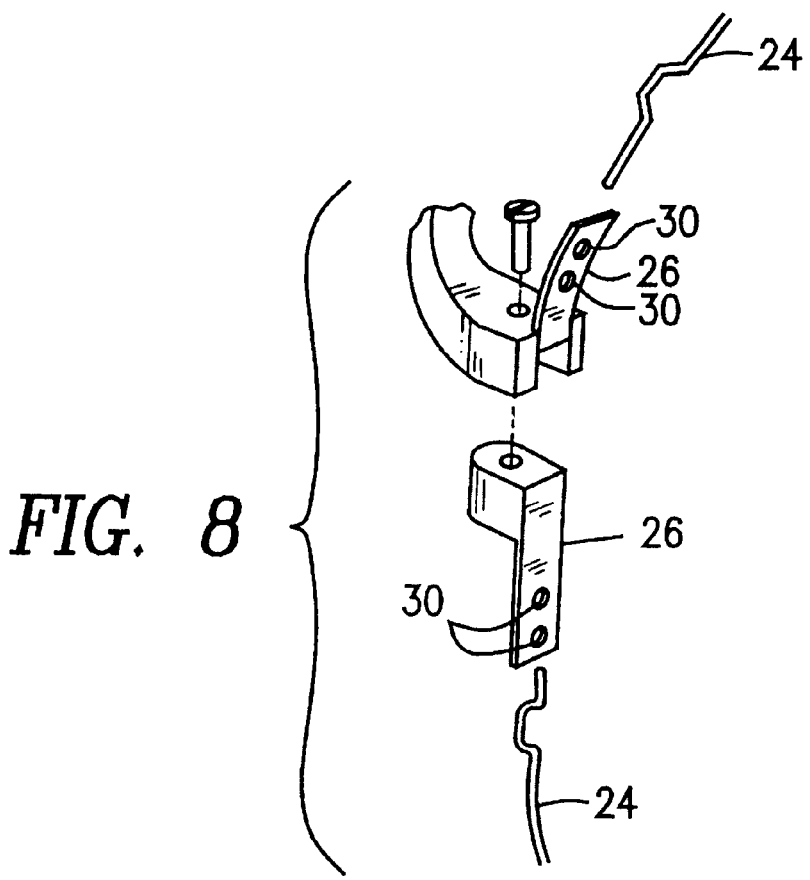
FIG. 8 is an enlarged and exploded view of the assembly on one of the temple sides of the rimless eyeglasses shown in FIG. 6.

In the second embodiment of FIG. 6, the anchoring plates 26 may be constructed as one unitary anchoring plate with a set of holes 30 on the upward protrusion of anchoring plate 26 and another set of holes 30 on the downward protrusion of anchoring plate 26 as shown on the nasal side 18 of rimless lens frame 44 in FIG. 7. Alternatively, anchoring plates 26 may be constructed as two pieces that are coupled together, either removably or fixedly, with a set of holes on the upper piece and a set of holes on the lower piece. FIG. 8 shows this "two-piece" anchoring plate 26 with two sets of holes 30, removably coupled together on the temple side 28 of rimless lens frame 44. In a further alternative embodiment, anchoring plates 26 may be constructed as a unitary piece with only one set of holes or as a "two-piece" anchoring plate with only one set of holes.

FIG. 7 shows an enlarged view of the interface on one of the nasal sides 18 of rimless eyeglasses 42 shown in FIG. 6. In FIG. 7, the interface is shown as comprised of one unitary anchoring plate 26 with two sets of holes 30, as described above. Anchoring plate 26 is preferably flat and elongated, but the invention contemplates anchoring plate 26 of other shapes as well. For example, anchoring plate 26 need not be flat, but may be the same shape and dimensions as the bridge 16. On the nasal side 18 of rimless lens frames 44, anchoring plate 26 can be formed as part of, or an extension of, bridge 16.

Two flexible strands 24 are shown in FIG. 7, one forming the lower portion of rimless lens frame 44 and one forming the upper portion of rimless lens frame 44. The ends of each flexible strand 24 are threaded through holes 30 in anchoring plate 26 and bonded to anchoring plate 26 at points "x". Flexible strand 24 is threaded through holes 30 and bonded in the same manner as is shown in FIG. 3 and described above with regard to the first embodiment.

FIG. 8 shows an exploded view of the assembly on one of the temple sides 28 of rimless eyeglasses 42 shown in FIG. 6. FIG. 8 is the same as that shown in FIG. 4 of the first embodiment except that rigid upper support portion 22 in FIG. 4 is replaced by anchoring plate 26 with holes 30 and flexible strand 24 which is threaded through holes 30 and bonded to anchoring plate 26 as described above.

As another alternative embodiment of the present invention for semi-rimless eyeglasses, lens frames 12 can be comprised of flexible strand 24 that is constructed as a unitary piece with anchoring plate 26 on one side of the lens while flexible strand 24 is both threaded and bonded to anchoring plate 26 on the opposite side of lens frames 12 as shown in FIGS. 2–4. Another alternative embodiment of the present invention for rimless eyeglasses comprises rimless lens frames 44 comprised of flexible strands 24 on the upper and lower half of the lens frames 44 which are constructed as a unitary piece with the anchoring plate or plates on the nasal side of the frames, while flexible strands 24 are both threaded and bonded on the temple side of the frames as shown in FIG. 8.

Although the invention has been described in its preferred form with a certain degree of particularity, it should be understood that the present disclosure of the preferred form may be changed in the details of construction and the combination and arrangement of parts may be resorted to without departing from the spirit and the scope of the invention as hereinafter claimed.

What is claimed is:

1. A lens frame, comprising:
   an upper frame portion operable to receive a lens;
   an anchoring plate coupled to the upper frame portion, said anchoring plate having at least one hole formed therein; and
   a flexible strand defining a lower frame portion, said flexible strand being coupled to said anchoring plate by threading said flexible strand through said at least one hole and mechanically bonding said strand to said anchoring plate.

2. The lens frame of claim 1, wherein said upper frame portion is rigid.

3. The lens frame of claim 1, wherein said strand is mechanically bonded to said anchoring plate at a location above said at least one hole.

4. A lens frame, comprising:
   a rigid upper frame portion;
   an anchoring plate coupled to said upper frame portion, said anchoring plate having at least one hole formed therein; and
   a lower frame portion coupled to said rigid upper frame portion, said lower frame portion comprising a flexible strand, said flexible strand being coupled to said anchoring plate by threading said flexible strand through said at least one hole and mechanically bonding said strand to said anchoring plate.

5. The lens frame of claim 4, wherein said strand is mechanically bonded to said anchoring plate at a location above said at least one hole.

6. The lens frame of claim 4, wherein said anchoring plate is integral with said rigid upper frame portion.

7. The lens frame of claim 4, wherein said anchoring plate is removeably coupled to said rigid upper frame portion.

8. The lens frame of claim 4, wherein said flexible strand is threaded through said at least one hole in such a manner that it abuts sharp edges of said at least one hole to form a frictional adhesion between said sharp edges and said flexible strand.

9. The lens frame of claim 4, wherein said flexible strand is mechanically bonded to said anchoring plate by soldering.

10. The lens frame of claim 4, wherein said flexible strand comprises a metal wire.

11. The lens frame of claim 10, wherein said metal wire is 0.7 mm or less in diameter.

12. The lens frame of claim 4, wherein
    said rigid upper frame portion has first and second opposite ends, said anchoring plate is a first anchoring plate permanently coupled to said rigid upper frame portion at said first end thereof, said lens frame further comprising:
    a second anchoring plate removably coupled to said second end of said rigid upper frame portion, said second anchoring plate having at least one hole formed therein;
    wherein said flexible strand has first and second opposite ends, said second end of said flexible strand being coupled to said second anchoring plate by threading said second end of said flexible strand through said at least one hole of said second anchoring plate and being mechanically bonded to said second anchoring plate at a location above said at least one hole of said second anchoring plate.

13. A rimless lens frame, comprising:
    first and second rigid lateral support portions, one of said rigid lateral support portions having at least one hole formed therein; and
    upper and lower flexible strands coupled to said first and second lateral support portions to define a lens holding frame;
    wherein one end of one of said flexible strands is threaded through said at least one hole in said one rigid lateral support portion and wherein said one end is mechanically bonded to said one rigid lateral support portion.

14. The rimless lens frame of claim 13, wherein said one flexible strand is mechanically bonded at a position between said at least one hole and said one end of said one flexible strand.

15. The rimless lens frame of claim 13, further comprising an anchoring plate integrally formed with said one rigid lateral support.

16. The rimless lens frame of claim 13, further comprising an anchoring plate removeably coupled to said one rigid lateral support.

17. The rimless lens frame of claim 13, wherein said flexible strand is threaded through said at least one hole in such a manner that it abuts sharp edges of said at least one hole to form a frictional adhesion between said sharp edges and said flexible strand.

18. The rimless lens frame of claim 13, wherein said one flexible strand is bonded to said one rigid lateral support portion by soldering.

19. The rimless lens frame of claim 13, wherein said one flexible strand comprises a metal wire.

20. The rimless lens frame of claim 19, wherein said metal wire is 0.7 mm or less in diameter.

21. Eyeglasses, comprising:

first and second lenses, each of said lenses having respective grooves formed therein;

first and second lens frames respectively supporting said first and second lenses;

a bridge located between said first and second lens frames;

first and second temple support pieces located on opposite outer sides of said first and second lens frames so that said first and second temple support pieces are respectively associated with said first and second lens frames;

each of said lens frames comprising:
  a rigid upper support portion having two ends, one end of said rigid upper support portion being coupled to said bridge, said other end being coupled to its associated temple support piece;
  a lower support portion comprising a flexible strand, said flexible strand being disposed in said groove of said associated lens, said flexible strand having two ends, one end of said flexible strand being coupled to said bridge, said other end of said flexible strand being coupled to its associated temple support piece; and
  an anchoring plate coupled to either said bridge or its associated said temple support piece, said anchoring plate having at least one hole formed therein, wherein at least one end of one of said flexible strand is coupled to said anchoring plate, said end of said flexible strand being threaded through said at least one hole and being mechanically bonded to said anchoring plate.

22. The eyeglasses of claim 21, wherein said flexible strand is mechanically bonded to said anchoring plate at a position between said at least one hole and said end of said flexible strand.

23. The eyeglasses of claim 21, wherein said flexible strand is threaded through said at least one hole in such a manner that it abuts sharp edges of said at least one hole to form a frictional adhesion between said sharp edges and said flexible strand.

24. The eyeglasses of claim 21, wherein said flexible strand is mechanically bonded to said anchoring plate by soldering.

25. The eyeglasses of claim 21, wherein said flexible strand comprises a metal wire.

26. The eyeglasses of claim 25, wherein said metal wire is 0.7 mm or less in diameter.

27. Rimless eyeglasses, comprising:

first and second lenses, each of said lenses having respective grooves formed therein;

first and second rimless lens frames respectively supporting said first and second lenses, each of said first and second rimless lens frames having an outer side;

a bridge located between said first and second rimless lens frames;

a first temple support piece located on said outer side of said first rimless lens frame;

a second temple support piece located on said outer side of said second rimless lens frame;

each of said rimless lens frames comprising:
  first and second rigid lateral support portions;
  upper and lower flexible strands coupled to said first and second lateral support portions; and
  an anchoring plate coupled to one of said first and second rigid lateral support portions, said anchoring plate having at least one hole formed therein, wherein at least one end of one of said flexible strands is coupled to said anchoring plate, and wherein said one end of said one flexible strand is threaded through said at least one hole and is mechanically bonded to said anchoring plate.

28. The rimless eyeglasses of claim 27, wherein said one flexible strand is mechanically bonded to said anchoring plate at a position between said at least one hole and said one end of said flexible strand.

29. The rimless eyeglasses of claim 27, wherein said one flexible strand is threaded through said at least one hole in such a manner that it abuts sharp edges of said at least one hole to form a frictional adhesion between said sharp edges and said one flexible strand.

30. The rimless eyeglasses of claim 27, wherein said one flexible strand is mechanically bonded to said anchoring plate by soldering.

31. The eyeglasses of claim 27, wherein said one flexible strand comprises a metal wire.

32. The eyeglasses of claim 31, wherein said metal wire is 0.7 mm or less in diameter.

* * * * *